(12) United States Patent
Chou

(10) Patent No.: US 7,548,442 B2
(45) Date of Patent: Jun. 16, 2009

(54) POWER CONVERTER WITH COUPLED INDUCTOR

(76) Inventor: Ming-Ching Chou, 11F-3, No. 8, Wen-Shan St., Nan-Tun Dist., Taichung-City (TW)

( * ) Notice: Subject to any disclaimer, the term of this patent is extended or adjusted under 35 U.S.C. 154(b) by 227 days.

(21) Appl. No.: 11/369,825

(22) Filed: Mar. 8, 2006

(65) Prior Publication Data

US 2007/0210765 A1 Sep. 13, 2007

(51) Int. Cl.
*G05F 1/59* (2006.01)
(52) U.S. Cl. .................... 363/127; 363/21.06; 323/282; 323/223
(58) Field of Classification Search ............... 363/21.04, 363/21.06, 127, 20, 21.05, 56.12, 77, 78, 363/84, 88, 125; 323/282, 222, 223
See application file for complete search history.

(56) References Cited

U.S. PATENT DOCUMENTS

| 6,256,214 | B1 * | 7/2001 | Farrington et al. | 363/127 |
| 6,507,174 | B1 * | 1/2003 | Qian | 323/222 |
| 7,068,020 | B2 * | 6/2006 | Inagawa et al. | 323/282 |

* cited by examiner

*Primary Examiner*—Akm E Ullah
*Assistant Examiner*—Harry Behm
(74) *Attorney, Agent, or Firm*—Rosenberg, Klein & Lee

(57) ABSTRACT

A power converter has simple coupled inductor circuit process the power and drive the semiconductor switch perfectly to reduce the power loss and eliminate the needs of high circuit complexity controller, improve the conversion efficiency and reduce the component counts to reach low cost and high reliability at one time.

17 Claims, 9 Drawing Sheets

POWER CONVERTER WITH COUPLED INDUCTOR

FIELD OF THE INVENTION

The present invention relates to DC-to-DC converters, AC-to-DC converters. The major characteristic of this converter is that transfer energy from input to output with high efficiency and low cost.

BACKGROUND OF THE INVENTION

In the field of power conversion technology, increasing the conversion efficiency and improve the reliability are the most important demands. Basically, conventional buck converter technology is desirable as it transfers the power from input to output with controlled function. However, the efficiency of conventional buck converter is limited at 90% maximum due to the power loss of fly-wheeling diode is proportioned with its junction voltage drop that dominate the total power loss. In order to overcome limitations in power loss and heat, the prior art has been devised the synchronous rectification technology.

FIG. 1a shows the synchronous rectification buck converter named as SR-Buck converter below. The SR-Buck converter has been derived from conventional buck converter by using the semiconductor switch such as MOSFET to replace fly-wheeling diode. The forward switch $S_{FW}$ is drive by a PWM signal for turned ON and turned OFF periodically to transfer the energy from input voltage source $V_I$ through inductor $L_O$ to smooth capacitor $C_O$ and load $R_L$. The fly-wheeling switch $S_{FL}$ is also drive by a PWM signal that complementary with the drive signal of forward switch $S_{FW}$ for turned ON and OFF periodically to discharge the stored energy of inductor $L_O$ to the smooth capacitor $C_O$ and load $R_L$. A small period of dead time between the turn ON time of forward switch $S_{FW}$ and fly-wheeling switch $S_{FL}$ is required to prevent the damage from short through behavior between $S_{FW}$ and $S_{FL}$. FIG. 1b shows the timing diagram of the circuit of FIG. 1a.

SR-Buck converter reduces the voltage drop of diode and its power loss allows the conversion efficiency is greater then 90% that the power handling of converter is improved. However, the optimal gate drive waveform is generated from high circuit complexity controller to keep the turned ON time of forward switch $S_{FW}$ and fly-wheeling switch $S_{FL}$ never overleap but as small as possible to obtain highest efficiency that the component selection is difficult to meet high reliability and cost effective requirement.

FIG. 2a shows the resonant reset forward converter with secondary passive drive synchronous rectifier circuit named as SR-Forward converter below. The secondary synchronous rectifier circuit has been derived from conventional rectifier by using semiconductor switch such as MOSFET to replace semiconductor diode each leg. The forward switch $S_{FW}$ is drive by secondary winding $W_S$ to selects connecting the output inductor to secondary winding transfer energy to smooth capacitor $C_O$ and load $R_L$ when the primary switch $S_P$ is turned ON to connect primary winding $W_P$ with input voltage source $V_I$. The fly-wheeling switch $S_{FL}$ may selects connecting the output inductor to ground during the reset time of transformer when the primary switch $S_P$ is turned OFF. The gate drive signal of primary switch $S_P$ is supplied from a simple PWM controller and the gate driving signals of forward switch $S_P$ and fly-wheeling switch $S_{FL}$ are supplied from transformer secondary directly. FIG. 2b shows the timing diagram of the circuit of FIG. 2a.

The SR-Forward converter reduce the power loss with minimum circuit complexity of controller, it take advantage from synchronous rectifier circuit to reach high efficiency just like most topologies. However, the fly-wheeling switch $S_{FL}$ will be turned OFF due to the reset voltage drop to zero before primary switch $S_P$ turned ON, it cause extra power loss due to low speed high voltage drop body diode conduct the load current limit the input voltage range for efficient operation.

What is the best power conversion technology? Higher efficiency, less circuit complexity of converter and wide range operation are the most important demands of power conversion technology.

SUMMARY OF THE INVENTION

The invention utilizes a power converter with new circuit concept to enhance the performance and reduce the circuit complexity at once. Briefly, this circuit consists of a coupled inductor, a forward switch and a fly-wheeling switch. The coupled inductor provides two paths for carry the load current during different operation stage. The forward switch provides a path to transfer the energy from input voltage source through the first winding of the coupled inductor to the load when it is turned ON, the fly-wheeling switch provides a path to discharge the energy stored in the coupled inductor through the second inductor winding of the coupled inductor to the load when forward switch is turned OFF.

The new circuit provides optimal performance for buck derived power converters: It improve the input voltage range for efficient operation, as it eliminate the body diode conduct stage; It simplifies converter construction, as it can be implemented without extra control circuits; It is worked well and do not require any additional devices, as it can be widely used with low cost.

BRIEF DESCRIPTION OF THE DRAWINGS

FIG. 1b shows the timing diagram of the circuit of FIG. 1a.
FIG. 2b shows the timing diagram of the circuit of FIG. 2a.
FIG. 4 shows the timing diagram of circuit in FIG. 3a.
FIG. 5a shows the forward transition stage of circuit in FIG. 3a.
FIG. 5b shows the forward stage of circuit in FIG. 3a.
FIG. 5c shows the fly-wheeling transition stage of circuit in FIG. 3a.
FIG. 5d shows the fly-wheeling stage of circuit in FIG. 3a.
FIG. 7 shows the timing diagram of the circuit in FIG. 6a.
FIG. 8a shows the forward transition stage of circuit in FIG. 6a.
FIG. 8b shows the forward stage of circuit in FIG. 6a.

FIG. 8c shows the fly-wheeling transition stage of circuit in FIG. 6a.

FIG. 8d shows the fly-wheeling stage of circuit in FIG. 6a.

DETAILED DESCRIPTION OF THE PREFERRED EMBODIMENTS

Figure 1A:
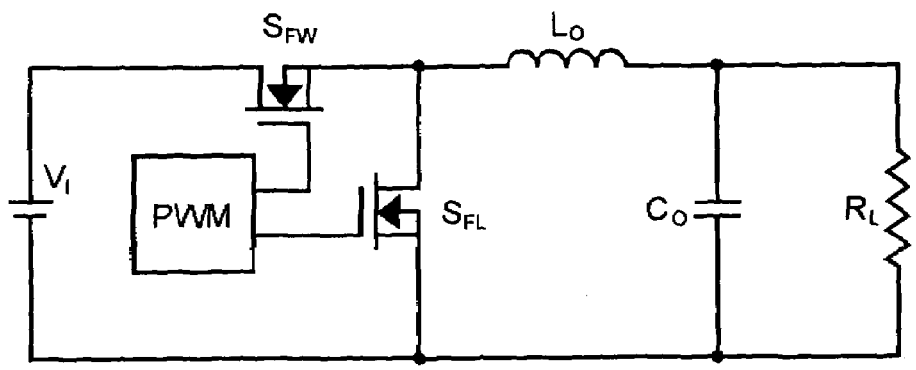
FIG. 1a shows the SR-Buck converter.
Figure 1B:
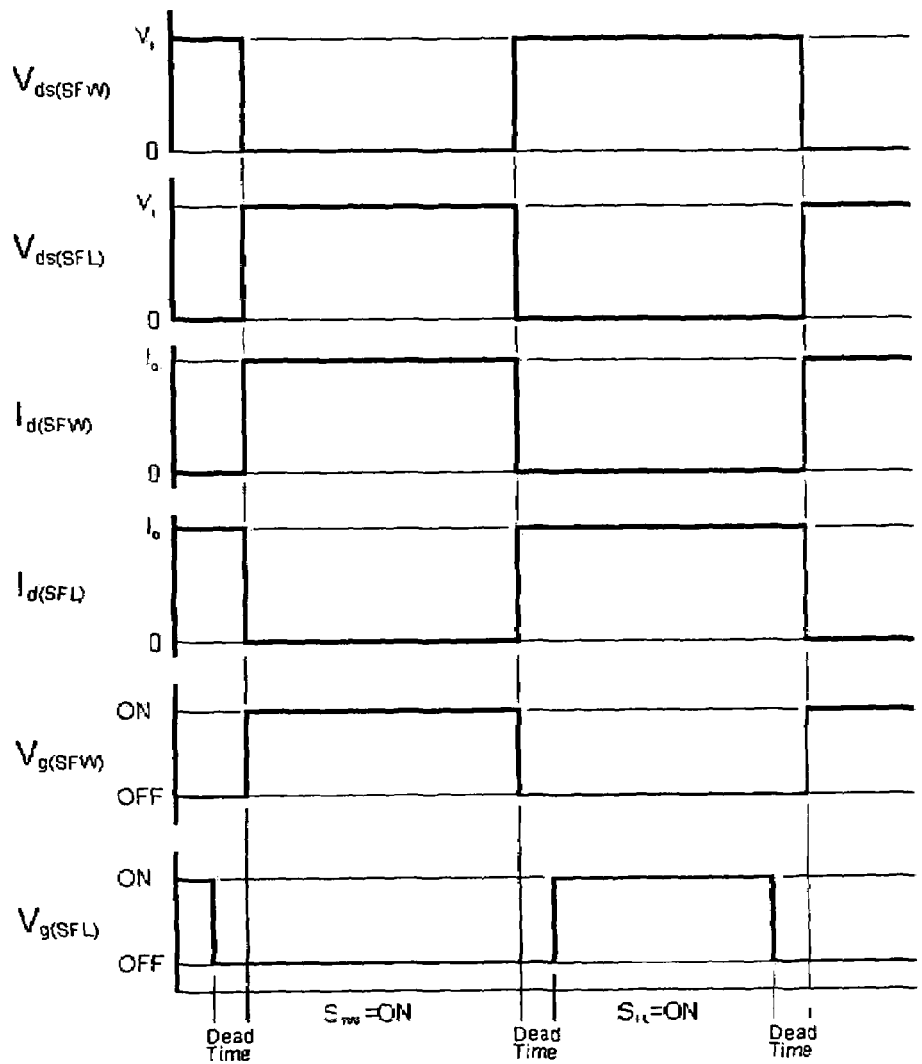
Figure 2A:
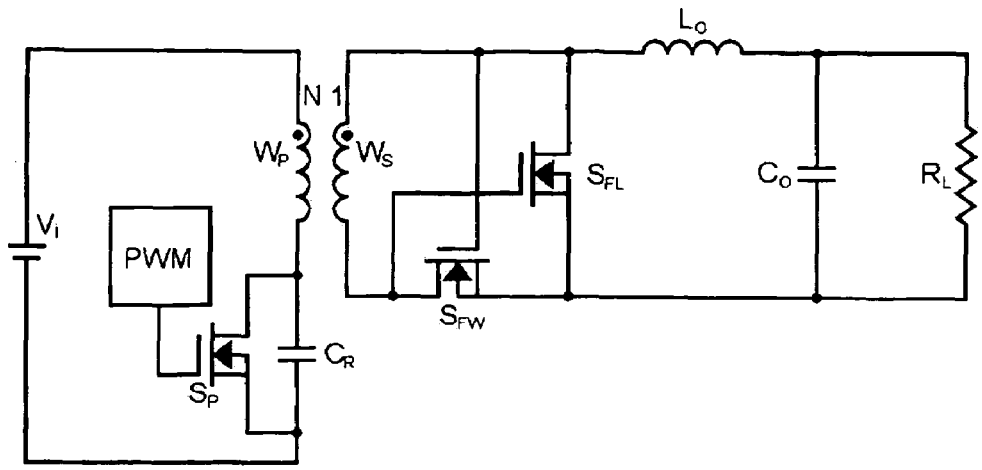
FIG. 2a shows the SR-Forward converter.
Figure 2B:
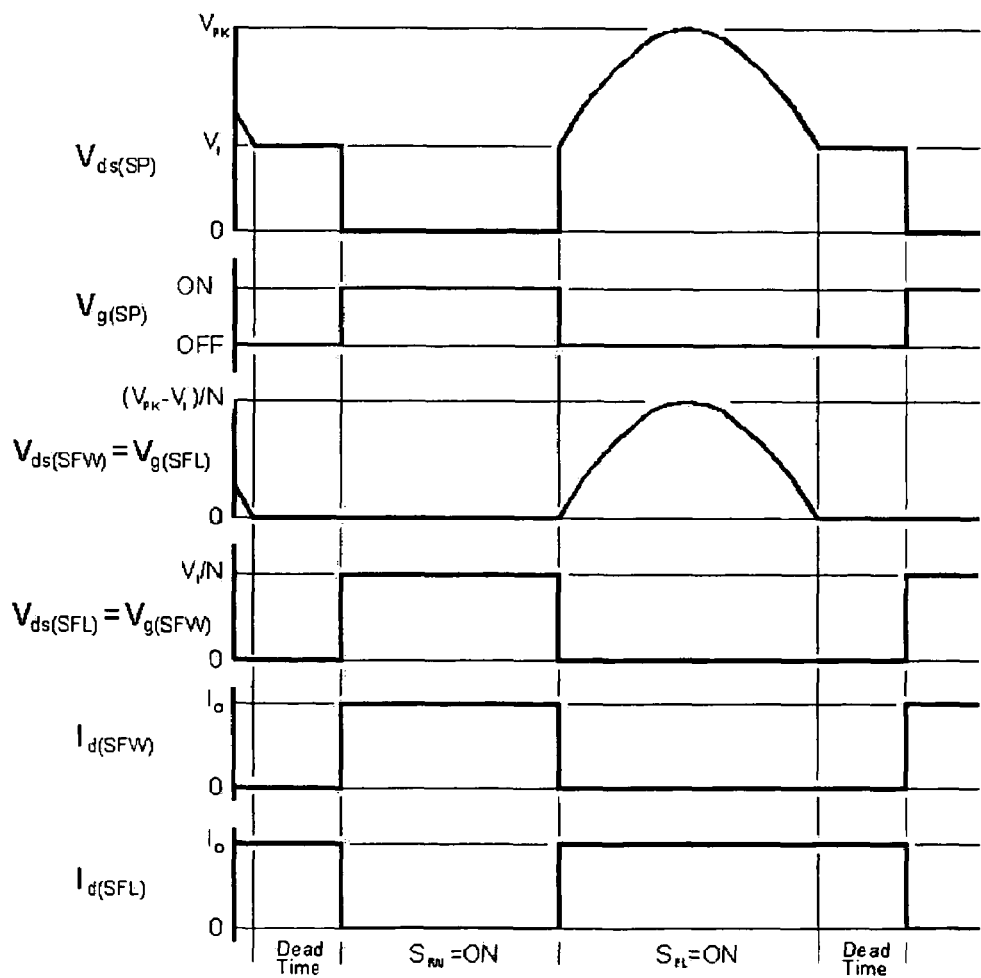
Figure 3A:
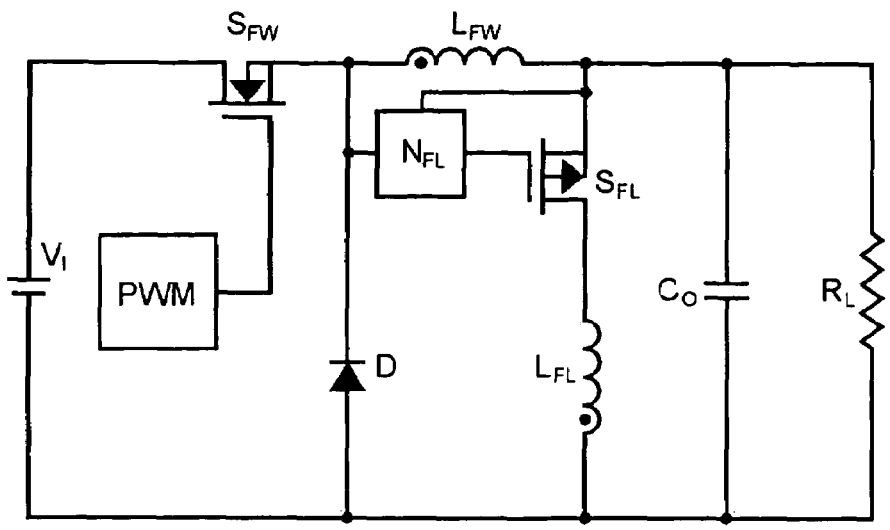
FIG. 3a shows the coupled inductor SR-Buck converter.

Referring now to the drawings, and more particular to FIG. 3a, a coupled inductor SR-Buck converter in accordance with the present invention is illustrated. A coupled inductor SR-Buck converter comprises input voltage source $V_I$, fly-wheeling switch $S_{FL}$, clamp diode D, gate voltage control network $N_{FL}$, coupled inductor including two inductor windings $L_{FW}$ and $L_{FL}$ and smooth capacitor $C_O$. The windings of coupled inductor are identical in the inductance and large enough to use as an output DC current source, and the output smooth capacitor is large enough to use as an output voltage source $V_O$ for theoretical analysis. The forward switch SFW provides a path to transfer the energy from input voltage source $V_I$ through inductor winding $L_{FW}$ to smooth capacitor $C_O$ when it is turn ON. The fly-wheeling switch $S_{FL}$ was either drive by the voltage of inductor winding $L_{FW}$ directly or through a gate voltage control network $N_{FL}$, and here the voltage control network can be a voltage damper or a voltage divider or even just a wire that no active function to control the timing of gate drive signal. Three typical circuits of voltage control network with the switch were shown as FIG. 3b. The clamp diode D some time was required for providing a path to discharge the energy that stored in the leakage inductance of coupled inductor when the stored energy is large enough to affect the efficiency greatly or an unacceptable voltage spike is generated by the energy that possible to damage the forward switch $S_{FW}$ and fly-wheeling switch $S_{FL}$. The discharge path of the stored energy in the leakage inductance may be through parasitic capacitance of forward switch SFW if the clamp diode is not connected.

Figure 3B:
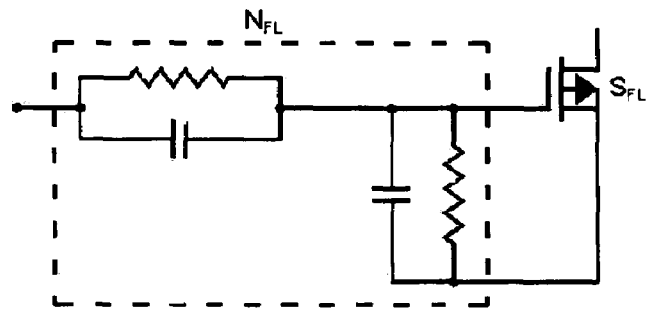
FIG. 3b shows the voltage control network circuits with SR switch.
Figure 3B:
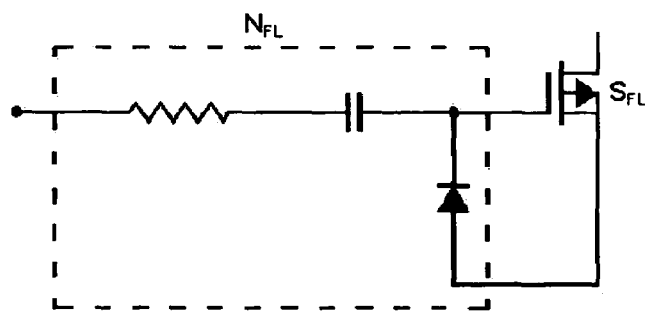
Figure 3B:
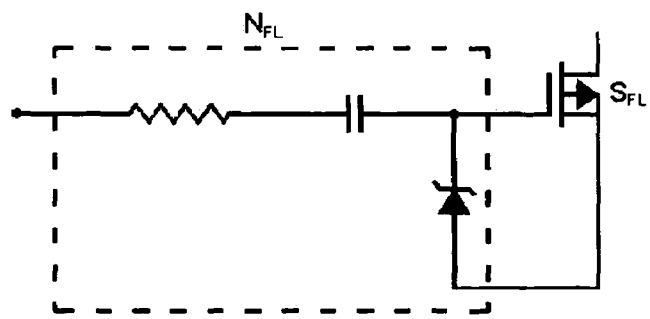
Figure 3C:
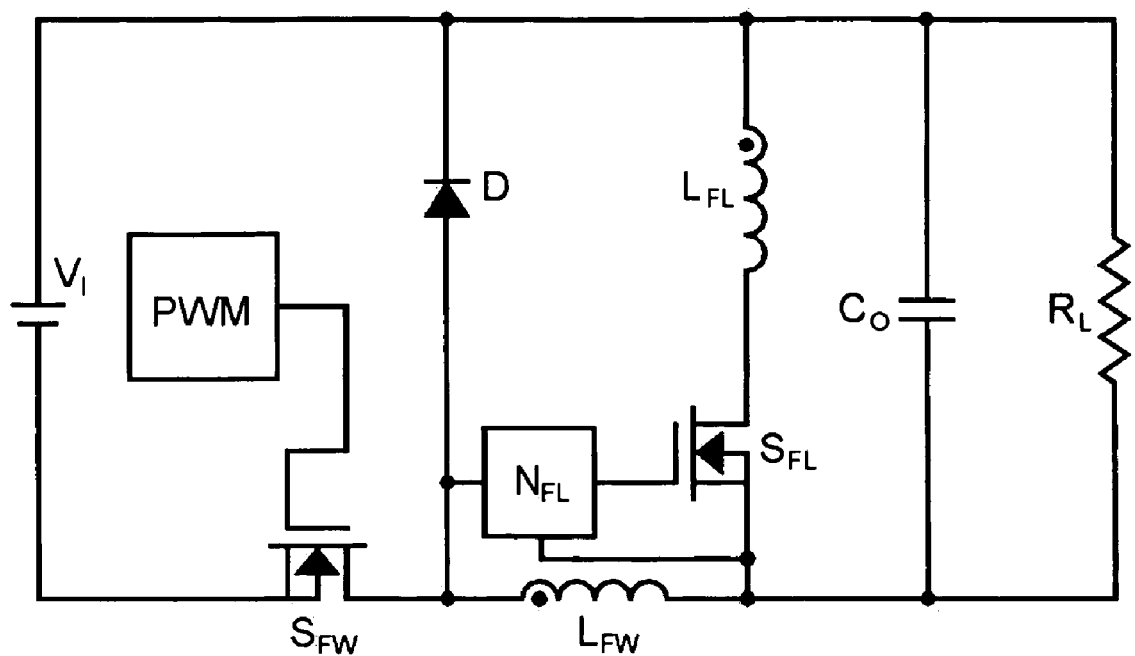
FIG. 3c shows the topological variations of coupled inductor SR-Buck converter.
Figure 4:
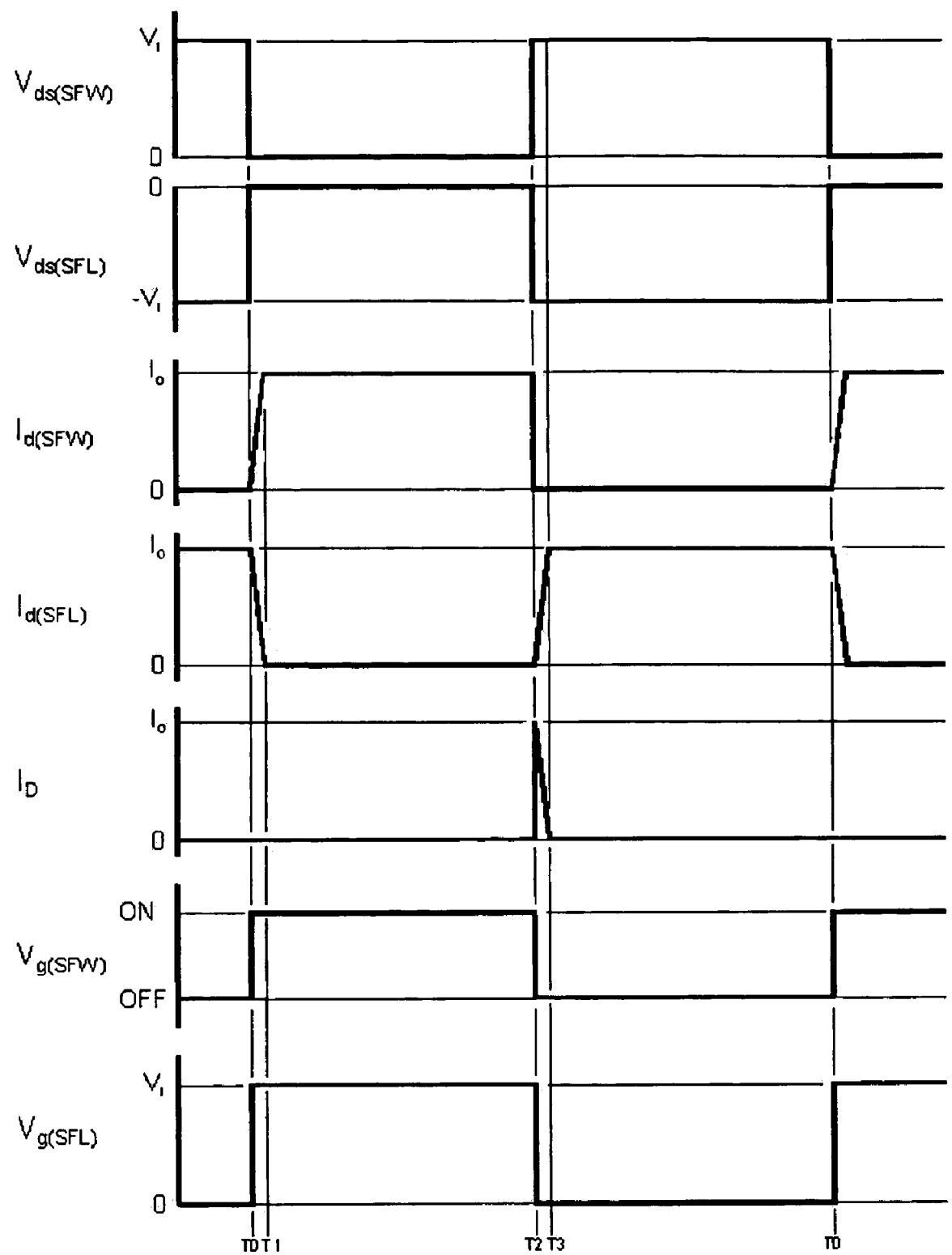

A coupled inductor SR-Buck converter show in FIG. 3a is easy to reorganize the power circuit and components by applying the duality principle simply to derive the topological variation show as FIG. 3c. The typical operation waveforms of coupled inductor SR-Buck converter were show in FIG. 4 is different from the prior art of conventional SR-Buck converter. Under steady-state operation, the coupled inductor SR-Buck converter has four stages are equal to four equivalent circuits within one switching cycle shown in FIG. 5a to FIG. 5d.

Figure 5A:
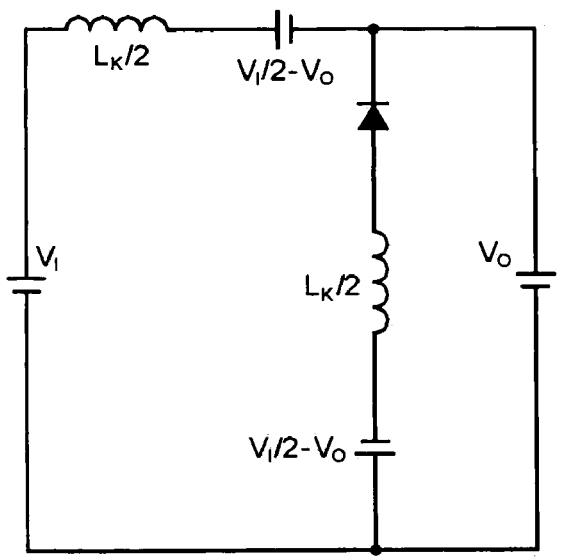

Referring to FIG. 5a, during T0 to T1 interval, the forward switch $S_{FW}$ is turned ON at T0, apply the voltage $V_I/2$ to the leakage inductance of inductor winding $L_{FW}$ cause the current of inductor winding $L_{FW}$ increased rapidly from zero to $I_O$ and decrease the current of inductor winding $L_{FL}$ from $I_O$ to zero simultaneously. Ideally, the voltage on the ideal coupled inductor is equal to $V_O - V_I/2$ during this period may ensure the absolute current change rate on both inductor windings are identical but it can adjust automatically to cover the difference of leakage inductance on each winding at practical applications. The fly-wheeling switch $S_{FL}$ is turned OFF before the current of inductor winding $L_{FL}$ reach to zero but still allow current flow through its body diode as a single direction switch. While the end of this interval, the current of inductor winding $L_{FW}$ is reached to $I_O$ at T1.

Figure 5B:
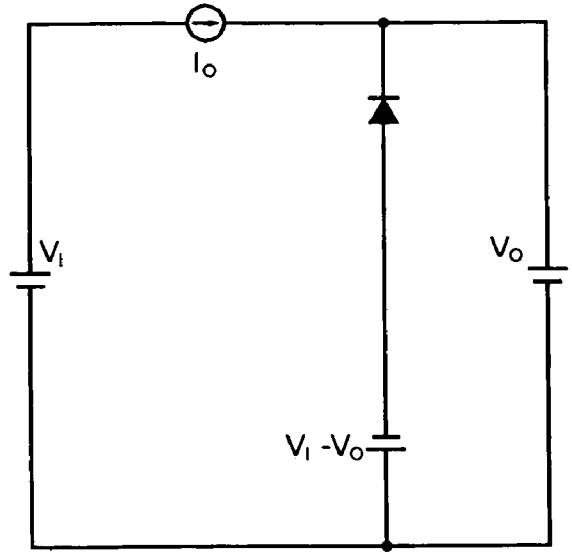

Referring to FIG. 5b, during T1 to T2 interval, the forward switch $S_{FW}$ was turned ON carry the current $I_O$ from input source $V_I$ through inductor winding $L_{FW}$ to the output voltage source $V_O$. While the end of this interval, the forward switch $S_{FW}$ is turned OFF at T2 and the conducting path through $S_{FW}$ is turned OFF at T2 and the conducting path through inductor winding $L_{FW}$ and forward switch $S_{FW}$ is blocked.

Figure 5C:
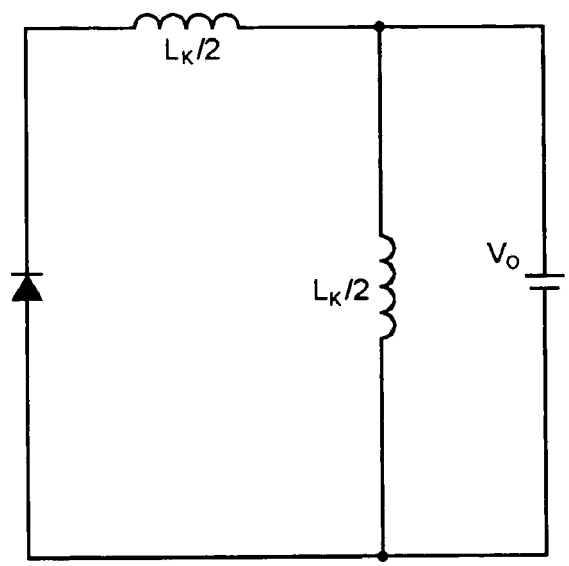

Referring to FIG. 5c, during T2 to T3 interval, the forward switch $S_{FW}$ is turned OFF at T2, the node voltage of inductor winding $L_{FW}$ connected with forward switch $S_{FW}$ is decreased rapidly, it drive the fly-wheeling switch $S_{FL}$ ON to carry current $I_O$ through inductor winding $L_{FL}$ avoid it flow through high voltage drop low speed body diode. The current of inductor winding $L_{FW}$ is conducted through clamp diode D to discharge the stored energy in the leakage inductance of inductor winding $L_{FW}$. While the end of this interval, the current of inductor winding $L_{FL}$ is increased to $I_O$ and the current of inductor winding $L_{FW}$ is decreased to zero at T3.

Figure 5D:
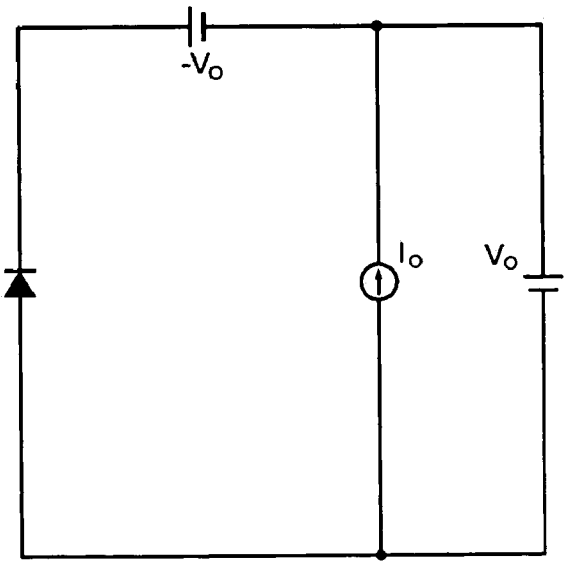

Referring to FIG. 5d, during T3 to T0 interval, the fly-wheeling switch $S_{FL}$ was turned ON during full period of this interval automatically to conduct the current $I_O$ through inductor winding $L_{FL}$ to output voltage source $V_O$. While the end of this interval, the forward switch $S_{FW}$ is turn ON to carry the current $I_O$ from input voltage source $V_I$ again to starting the next switching cycle.

The gate drive voltage of fly-wheeling switch $S_{FL}$ is discharged by the forward switch $S_{FW}$ before the load current $I_O$ fully coupled from inductor winding $L_{FL}$ to inductor winding $L_{FW}$, it eliminate the damage of short-through behavior between forward switch $S_{FW}$ and fly-wheeling switch $S_{FL}$ without the needs of precise gate drive control signal that generated from a high circuit complexity controller.

Figure 6A:
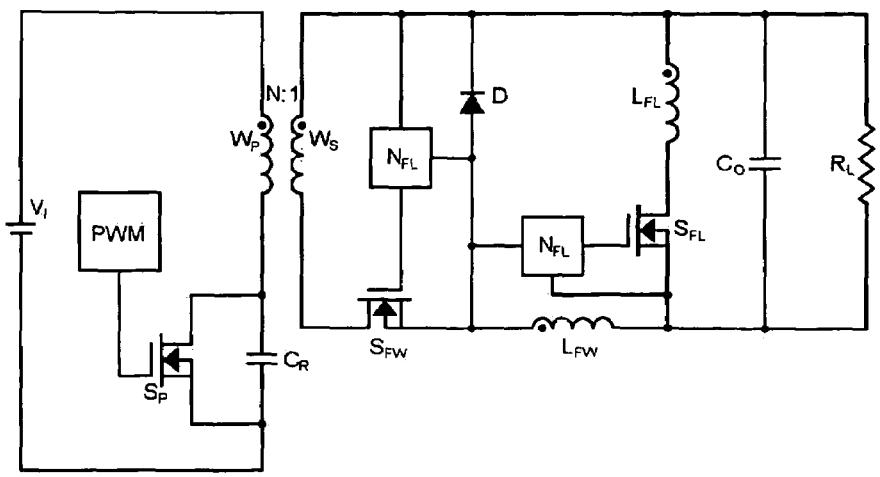
FIG. 6a shows the coupled inductor SR-Forward converter.

After the success on the coupled inductor SR-Buck converter, employing the same concept to several types of conventional SR-Forward converter would be the next step perfectly. The key concept of coupled inductor SR operation is concerning on its self-drive structure of the fly-wheeling switch only as coupled inductor SR can be cooperated perfectly with all buck-derived converters. A resonant reset coupled inductor SR-Forward converter was used as an example for better understanding and discussion shown as FIG. 6a.

The typical coupled inductor SR-Forward converter comprises the key primary side circuit of forward converter (input source $V_I$, primary switch $S_P$ and a transformer has primary winding $W_P$ and secondary winding $W_S$ with turn ratio N:1, where the reset technology of transformer is irrelevant), a secondary side circuit that similar to coupled inductor SR-Buck converter (forward switch $S_{FW}$, fly-wheeling switch $S_{FL}$, clamp diode D, gate voltage control networks $N_{FW}$ and $N_{FL}$, coupled inductor including two inductor windings $L_{FW}$ and $L_{FL}$ and smooth capacitor $C_O$. The windings of coupled inductor are identical in the inductance and large enough to used as an output DC current source, and the smooth capacitor $C_O$ is large enough to worked as an output voltage source $V_O$ for theoretical analysis).

Figure 6B:
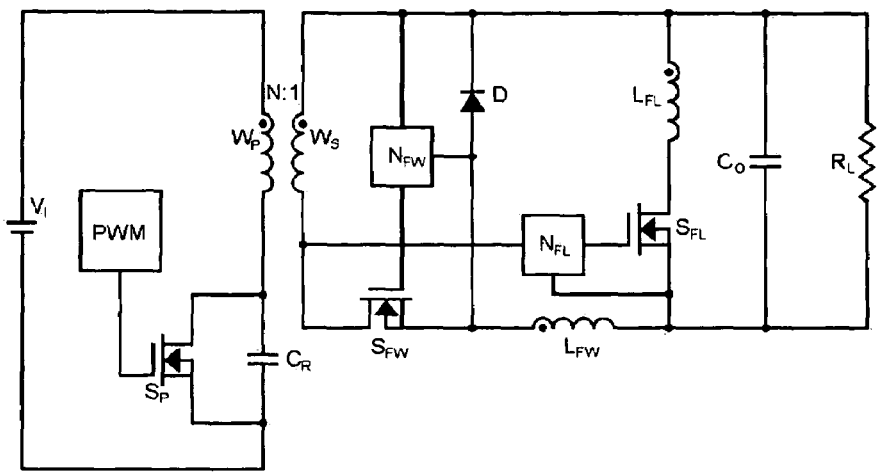
FIG. 6b shows the coupled inductor SR-Forward converter with different connection.

The forward switch $S_{FW}$ is drive by a signal from a drive transformer winding or a external driver that synchronous with primary switch $S_P$ to turned ON and turned OFF but in the most case is drive by the voltage of transformer secondary winding through a gate voltage control networks $N_{FW}$, and here the voltage control network can be a voltage damper or a voltage divider was shown as FIG. 3b or even just a wire that no active function to control the timing of gate drive signal. The operation is similar to coupled inductor SR-Buck converter described above as it just like the forward switch $S_{FW}$ connected with a mirrored voltage source from primary side provides a path to transfer the energy through inductor winding $L_{FW}$ to smooth capacitor $C_O$ when primary switch $S_P$ is turn ON. The clamp diode D can be an option to discharge the stored energy in the leakage inductance of coupled inductor to smooth capacitor $C_O$ when the forward switch $S_{FW}$ is turned OFF, the stored energy in the leakage inductance of coupled inductor will discharge back to input voltage source $V_I$ through the body diode of forward switch SFW and transformer if the clamp diode D is not applied. The fly-wheeling switch $S_{FL}$ is drive by inductor winding $L_{FW}$ through a gate voltage control network $N_{FL}$, and here the voltage control network can be a voltage damper or a voltage divider was shown as FIG. 3b or even just a wire that no active function to control the timing of gate drive signal. There is an alternative signal to drive the fly-wheeling switch $S_{FL}$ for low voltage application that the mirrored transformer reset voltage on the transformer secondary winding can be super-positioned on the voltage of inductor winding $L_{FW}$ to have better drive performance when the forward switch $S_{FW}$ was connected between transformer secondary winding $W_S$ and inductor winding $L_{FW}$ also can be seen in FIG. 6b.

Figure 6C:
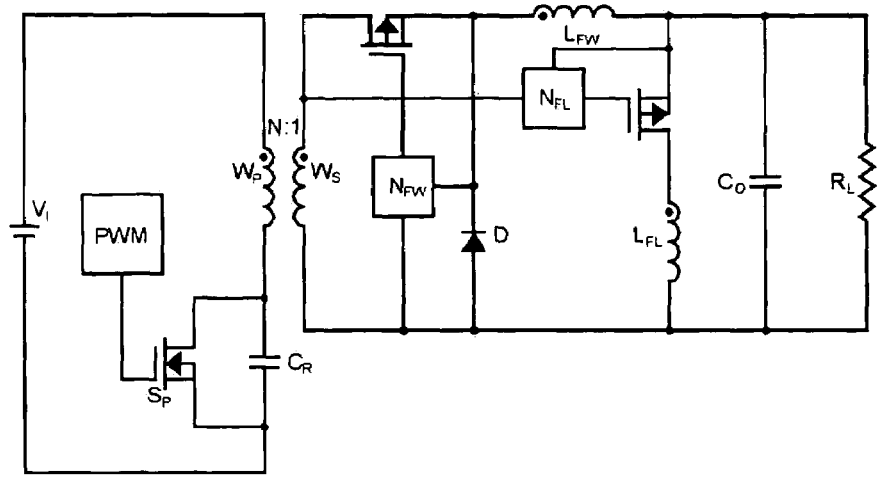
FIG. 6c shows the topological variation of coupled inductor SR-Forward converter.
Figure 7:
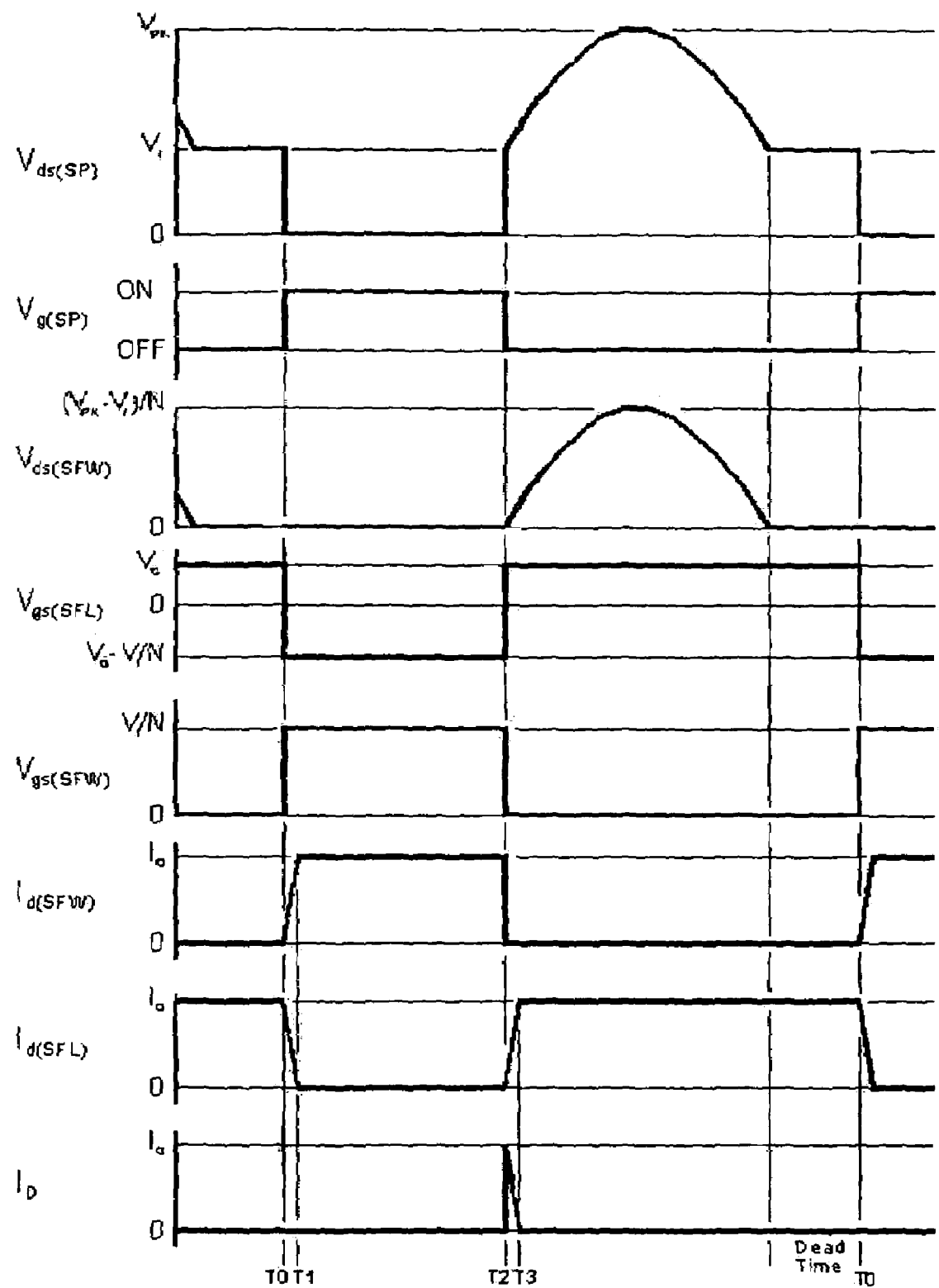

The typical coupled inductor SR-Forward converter is easy to reorganize the power circuit and components by applying the duality principle simply to derive the topological variation show as FIG. 6c. The typical operation waveforms show in FIG. 7 is different from the prior art of conventional SR-Forward converter. Under steady-state operation, the secondary circuit of coupled inductor SR-Forward converter has four stages are equal to four equivalent circuits within one switching cycle shown in FIG. 8a to FIG. 8d.

Figure 8A:
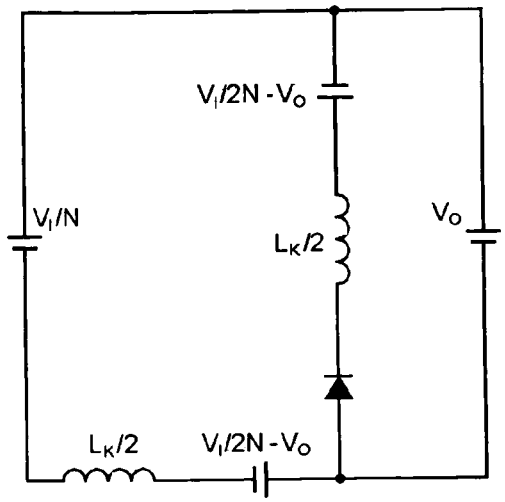

Referring to FIG. 8a, during T0 to T1 interval, the primary switch $S_P$ is turned ON to connect input voltage source $V_I$ to the primary winding $W_P$ of transformer. The forward switch $S_{FW}$ is also turned ON at T0 by the voltage $V_I/N$ of the secondary winding $W_S$ apply the voltage $V_I/2N$ to the leakage inductance of inductor winding $L_{FW}$ cause the current of inductor winding $L_{FW}$ increased rapidly from zero to $I_O$ and decrease the current of inductor winding $L_{FL}$ from $I_O$ to zero simultaneously. Ideally, the voltage on the ideal coupled inductor is equal to $V_O-V_I/2N$ during this period may ensure the absolute current change rate on both inductor windings are identical but it can adjust automatically to cover the difference of leakage inductance on each winding at practical applications. The fly-wheeling switch $S_{FL}$ is turned OFF before the current of inductor winding $L_{FL}$ reach to zero but still allow current flow through its body diode as a single direction switch. While the end of this interval, the current of inductor winding $L_{FW}$ is reached to $I_O$ to transfer energy from mirrored input voltage source $V_I/N$ through inductor winding $L_{FW}$ to the output voltage source $V_O$, the primary switch $S_P$ and the forward switch $S_{FW}$ are turned OFF at T1 and the conducting path through inductor winding $L_{FW}$ is blocked.

Figure 8B:
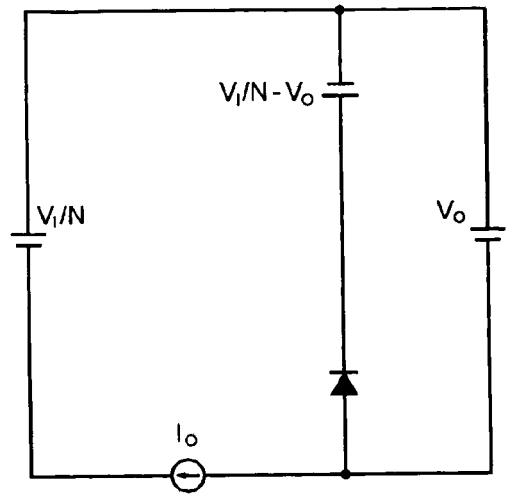

Referring to FIG. 8b, during T1 to T2 interval, the forward switch $S_{FW}$ was turned ON carry the current $I_O$ from mirrored input source $V_I/N$ through inductor winding $L_{FW}$ to the output voltage source $V_O$. While the end of this interval, the forward switch $S_{FW}$ is turned OFF at T2 and the conducting path through inductor winding $L_{FW}$ and forward switch $S_{FW}$ is blocked.

Figure 8C:
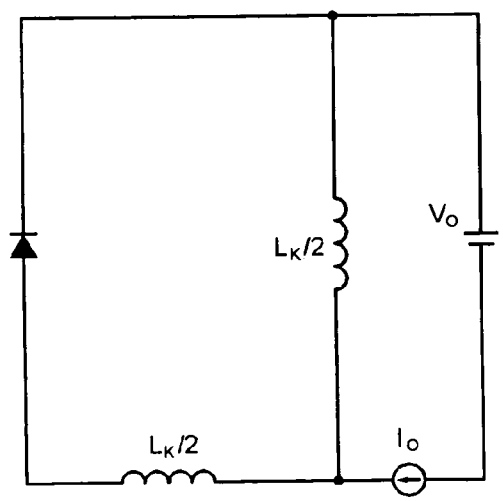

Referring to FIG. 8c, during T2 to T3 interval, the primary switch $S_P$ and forward switch $S_{FW}$ are turned OFF at T2, the node voltage of inductor winding $L_{FW}$ connected with forward switch $S_{FW}$ is increased rapidly, it drive the fly-wheeling switch $S_{FL}$ ON to carry current $I_O$ through inductor winding $L_{FL}$ avoid it flow through high voltage drop low speed body diode. The current of inductor winding $L_{FW}$ is conducted through clamp diode D to discharge the stored energy in the leakage inductance of inductor winding $L_{FW}$. While the end of this interval, the current of inductor winding $L_{FL}$ is increased to $I_O$ and the current of inductor winding $L_{FW}$ is decreased to zero at T3.

Figure 8D:
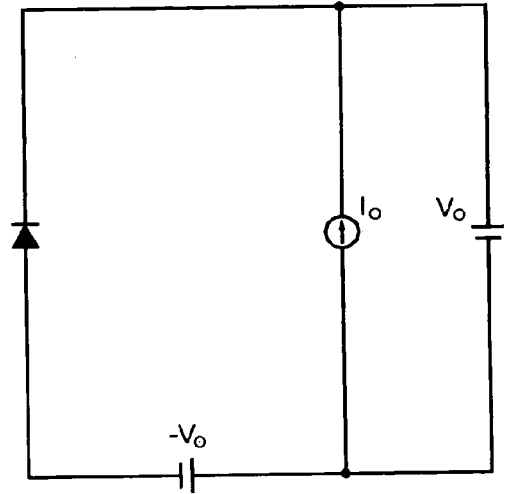

Referring to FIG. 8d, during T3 to T0 interval, the fly-wheeling switch $S_{FL}$ was turned ON during full period of this interval automatically to conduct the current $I_O$ through inductor winding $L_{FL}$ to output voltage source $V_O$. While the end of this interval, the forward switch $S_{FW}$ is turn ON to carry the current $I_O$ from input voltage source $V_I$ again to starting the next switching cycle.

The gate drive voltage of fly-wheeling switch $S_{FL}$ is discharged by the forward switch $S_{FW}$ before the load current $I_O$ fully coupled from inductor winding $L_{FL}$ to inductor winding $L_{FW}$, it eliminate the damage of short-through behavior between forward switch $S_{FW}$ and fly-wheeling switch $S_{FL}$ without the needs of precise gate drive control signal that generated from a high circuit complexity controller.

A power converter with coupled inductor SR circuit eliminate the body diode conduction stage, as it keep fly-wheeling switch turn ON automatically during forward switch OFF period; it prevent the damages from the short through between forward switch and fly-wheeling switch inherently, as it can turn fly-wheeling switch OFF before forward switch began conduct the current inherently; It simplifies converter construction, as it can be implemented without extra control circuits; It is worked well and do not require any additional devices, as it can be used widely with low cost.

Based on analysis above, the key concept of this invention is concerning on its self-drive structure of the fly-wheeling switch only as this invention can be used with all buck-derived converters, and while the invention has been described in terms of a single preferred embodiment, those skilled in the art will recognize that the invention can be practiced with modification on different transformer reset technology and different drive method of forward switch still within the spirit and scope of the appended claims.

What is claimed is:

1. A coupled inductor SR-Buck converter comprising:
   an input voltage source having a positive terminal and a negative terminal;
   a smoothing capacitor having a first terminal and a second terminal;
   a resistive load connected in parallel with said smoothing capacitor;
   a first inductor winding have having a first terminal and a second terminal, said second terminal of said first inductor winding being connected with said first terminal of said smoothing capacitor;
   a second inductor winding having a first terminal and a second terminal and being magnetically coupled with said first inductor winding and in the same polarity, said first terminal of said second inductor winding being connected with said second terminal of said smoothing capacitor;
   a controller;
   a forward switch connected in series with said input voltage source between said input voltage source and said first terminal of said first inductor winding, and being controlled by said controller to be periodically and alternately turned ON and turned OFF for periodically connecting a positive voltage to said first terminal of said first inductor winding;
   a fly-wheeling switch drive voltage control network;
   a fly-wheeling switch connected in series between said second terminal of said second inductor winding and said first terminal of said smoothing capacitor, and controlled via a voltage of said first terminal of said first inductor winding through said fly-wheeling switch drive voltage control network such that (a) said fly-wheeling switch is closed when voltage of said first terminal of said first inductor winding is negative, and (b) said fly-wheeling switch is opened when voltage of said first terminal of said first inductor winding is positive.

2. Said coupled inductor SR-Buck converter of claim 1 wherein said forward switch is MOSFET transistor with an integral reverse diode.

3. Said coupled inductor SR-Buck converter of claim 1 wherein said fly-wheeling switch is a MOSFET transistor with an integral reverse diode.

4. Said coupled inductor SR-Buck converter of claim 1, further comprising a clamp diode having an anode and a cathode, said anode being connected with said second terminal of said smoothing capacitor, and said cathode being connected with said first terminal of said first inductor winding.

5. A coupled inductor SR-Buck converter comprising:
an input voltage source having a positive terminal and a negative terminal;
a smoothing capacitor having a first terminal and a second terminal;
a resistive load connected in parallel with said smoothing capacitor;
a first inductor winding having a first terminal and second terminal, said second terminal of said first inductor winding being connected with said second terminal of said smoothing capacitor;
a second inductor winding having a first terminal and a second terminal and being magnetically coupled with said first inductor winding and in the same polarity, said first terminal of said second inductor winding being connected with said first terminal of said smoothing capacitor;
a controller;
a forward switch connected in series with said input voltage source between said input voltage source and said first terminal of said first inductor winding, and being controlled by said controller to be periodically and alternately turned ON and turned OFF for periodically connecting a negative voltage to said first terminal of said first inductor winding;
a fly-wheeling switch drive voltage control network;
a fly-wheeling switch connected in series between said second terminal of said second inductor winding and said second terminal of said smoothing capacitor, and controlled via a voltage of said first terminal of said first inductor winding through said fly-wheeling switch drive voltage control network such that (a) said fly-wheeling switch is closed when voltage of said first terminal of said first inductor winding is positive, and (b) said fly-wheeling switch is opened when voltage of said first terminal of said first inductor winding is negative.

6. Said coupled inductor SR-Buck converter of claim 5 wherein said forward switch is MOSFET transistor with an integral reverse diode.

7. Said coupled inductor SR-Buck converter of claim 5 wherein said fly-wheeling switch is a MOSFET transistor with an integral reverse diode.

8. Said coupled inductor SR-Buck converter of claim 5, further comprising a clamp diode having an anode and a cathode, said anode being connected with said first terminal of said first inductor winding, and said cathode being connected with said first terminal of said smoothing capacitor.

9. A coupled inductor SR-Forward converter comprising:
an input voltage source having a positive terminal and a negative terminal;
a smoothing capacitor having a first terminal and a second terminal;
a resistive load connected in parallel with said smoothing capacitor;
a transformer comprising a primary winding and a secondary winding, said primary winding having a first terminal and a second terminal, said secondary winding having a first terminal and a second terminal and being magnetically coupled with said primary winding and in the same polarity, said first terminal of said primary winding being connected with said positive terminal of said input voltage source;
a controller;
a primary switch connected in series between said negative terminal of said input voltage source and said second terminal of said primary winding of said transformer, said primary switch being controlled by said controller to be periodically and alternately turned ON and turned OFF;
a first inductor winding having a first terminal and a second terminal, said second terminal of said first inductor winding being connected with said second terminal of said smoothing capacitor;
a second inductor winding having a first terminal and a second terminal and being magnetically coupled with said first inductor winding and in the same polarity, said first terminal of said second inductor winding being connected with said first terminal of said smoothing capacitor;
a forward switch drive voltage control network;
a forward switch connected in series with said secondary winding of said transformer between said second terminal of said secondary winding of said transformer and said first terminal of said first inductor winding, and driven by a voltage signal through said forward switch drive voltage control network that is synchronous with said primary switch such that (a) said forward switch is closed to connect a negative voltage to said first terminal of said first inductor winding when said primary switch is turned ON, and (b) said forward switch is opened when said primary switch is turned OFF;
a fly-wheeling switch drive voltage control network;
a fly-wheeling switch connected in series between said second terminal of said second inductor winding and said second terminal of said smoothing capacitor, and controlled through said fly-wheeling switch drive voltage control network such that (a) said fly-wheeling switch is closed when voltage of said first terminal of said first inductor winding is positive, and (b) said fly-wheeling switch is opened when voltage of said first terminal of said first inductor winding is negative.

10. Said coupled inductor SR-Forward converter of claim 9 wherein said forward switch is MOSFET transistor with an integral reverse diode.

11. Said coupled inductor SR-Forward converter of claim 9 wherein said fly-wheeling switch is a MOSFET transistor with an integral reverse diode.

12. Said coupled inductor SR-Forward converter of claim 9 wherein said fly-wheeling switch is controlled via voltage of said second terminal of said secondary winding of said transformer.

13. Said coupled inductor SR-Forward converter of claim 9, further comprising a clamp diode having an anode and a cathode, said anode being connected with said first terminal of said first inductor winding, and said cathode being connected with said first terminal of said smoothing capacitor.

14. A coupled inductor SR-Forward converter comprising:
an input voltage source having a positive terminal and a negative terminal;
a smoothing capacitor having a first terminal and a second terminal;
a resistive load connected in parallel with said smoothing capacitor;

a transformer comprising a primary winding and a secondary winding, said primary winding having a first terminal and a second terminal, said secondary winding having a first terminal and a second terminal and being magnetically coupled with said first inductor winding and in the same polarity, said first terminal of said primary winding being connected with said positive terminal of said input voltage source;

a controller;

a primary switch connected in series between said negative terminal of said input voltage source and said second terminal of said primary winding of said transformer, and being controlled by said controller to be periodically and alternately turned ON and turned OFF;

a first inductor winding having a first terminal and a second terminal, said second terminal of said first inductor winding being connected with said first terminal of said smoothing capacitor;

a second inductor winding having a first terminal and a second terminal, and being magnetically coupled with said first inductor winding and in the same polarity, said second terminal of said second inductor winding being connected with said second terminal of said smoothing capacitor;

a forward switch drive voltage control network;

a forward switch connected in series with said secondary winding of said transformer between said first terminal of said secondary winding of said transformer and said first terminal of said first inductor winding, and driven by a voltage signal through said forward switch drive voltage control network that is synchronous with said primary switch such that (a) said forward switch is closed to connect a positive voltage to said first terminal of said first inductor winding when said primary switch is turned ON, and (b) said forward switch is opened when said primary switch is turned OFF;

a fly-wheeling switch drive voltage control network;

a fly-wheeling switch connected in series between said first terminal of said second inductor winding and said first terminal of said smoothing capacitor, and controlled via said voltage of said first terminal of said secondary winding of said transformer through said fly-wheeling switch drive voltage control network such that (a) said fly-wheeling switch is closed when a voltage of said first terminal of said first terminal of said secondary winding of said transformer is negative, and (b) said fly-wheeling switch is opened when voltage of said first terminal of said first inductor winding is positive.

15. Said coupled inductor SR-Forward converter of claim 14 wherein said forward switch is MOSFET transistor with an integral reverse diode.

16. Said coupled inductor SR-Forward converter of claim 14 wherein said fly-wheeling switch is a MOSFET transistor with an integral reverse diode.

17. Said coupled inductor SR-Forward converter of claim 14, further comprising a clamp diode having a anode and a cathode, said anode being connected with said second terminal of said smoothing capacitor, said cathode being connected with said first terminal of said first inductor winding.

\* \* \* \* \*